2,985,650

6α-AMMONIO-DERIVATIVES OF 11-KETO CORTICAL HORMONES

Enrique Batres and Howard J. Ringold, Mexico City, Mexico, assignors to Syntex S.A., Mexico City, Mexico, a corporation of Mexico No Drawing. Filed May 26, 1959, Ser. No. 815,822

Claims priority, application Mexico May 28, 1958

19 Claims. (Cl. 260—239.5)

The present invention relates to novel cyclopentanophenanthrene derivatives.

More particularly, it relates to the novel 6α-ammonio derivatives of steroidal 11-keto cortical hormones, and also comprises the novel intermediate 6-amino-derivatives of the steroidal 11-keto cortical hormones. More specifically, it relates to such derivatives of cortisone and prednisone, to their C-9α-chloro and fluoro derivatives, as well as to the esters of the aforementioned compounds.

The new compounds of the present invention exhibit valuable biological properties: they are anti-inflammatory drugs having glycogenic, thymolytic, anti-esterogenic and anti-androgenic properties.

These new compounds and the novel 6-amino intermediates are illustrated by the following formulas:

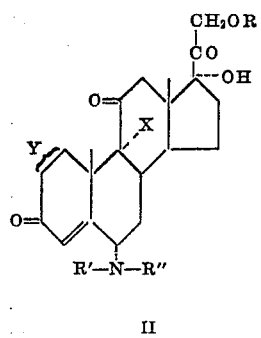
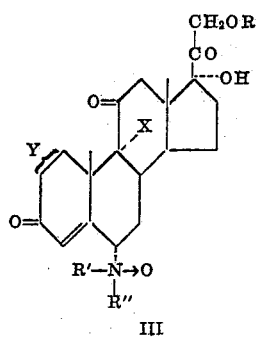

and

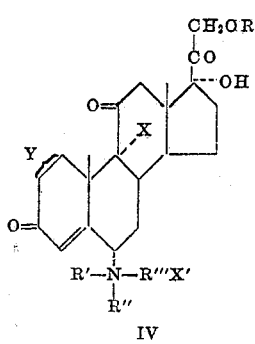

In the above formulas Y represents a double bond between C–1 and C–2 or a saturated linkage between C–1 and C–2, R represents hydrogen or a hydrocarbon carboxylic acyl group of up to 12 carbon atoms. This acyl group, as is conventional in steroid esters, may be substituted or unsubstituted, saturated or unsaturated, straight or branched chain aliphatic, cyclic or mixed cyclic-aliphatic. Typical are acetate, propionate, butyrate, hemisuccinate, enanthate, caproate, benzoate, trimethylacetate, phenoxyacetate, cyclopentylpropionate, phenylpropionate or β-chloropropionate. X represents hydrogen, fluoro or chloro. R' and R" both may represent hydrocarbon residues of up to 12 carbon atoms, or both R' and R" may together form a cyclic group or both R' and R" may be a cyclic group or a mixed cyclic-aliphatic group. In formula II above where both R' and R" are hydrocarbon residues the amino group is of course tertiary and where one of R' or R" is hydrogen the amino group is secondary. Compounds III and IV are derived from those of compound II where both R' and R" are hydrocarbon residues as will hereinafter be set forth. X' represents iodine, chlorine, bromine, $HSO_4$, $ArSO_3$, $ClO_4$, or hydroxy. R'" represents a hydrocrabon residue of up to 12 carbons.

The following equation illustrates the process for the production of the above compounds.

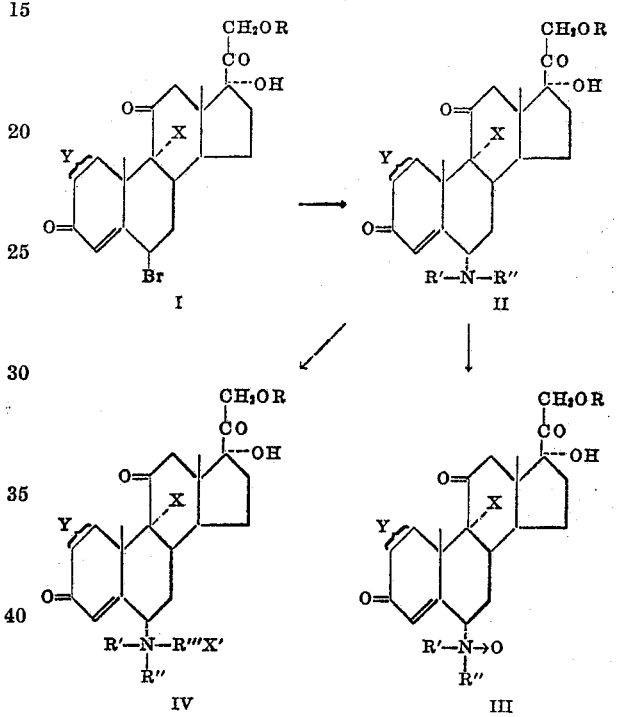

In the above equation as previously set forth, R represents hydrogen or acyl; X represents hydrogen, fluorine or chlorine; in a secondary 6α-amino compound of formula II R' represents a hydrocarbon residue and R" represents hydrogen; in a tertiary amino-compound II R' and R" represent hydrocarbon residues; in III, R' and R" represent hydrocarbon residues; in IV R', R" and R'" represent hydrocarbon residues and X' represents iodine, chlorine, bromine, $HSO_4$, $ArSO_3$ or $ClO_4$, as well as the hydroxyl group in the free bases; Y indicates the presence of a double bond between C–1 and C–2 or a saturated linkage.

In practicing the process above set forth, we started from the respective 6β-bromo cortical hormone, preferably as the acetate (I; R=Ac).

We reacted I with a primary amine to obtain a compound of formla II with a secondary amino group at C–6α (R'=hydrocarbon residue, R"=H), or the reaction was carried out with secondary amine to produce II with a tertiary amino group at C–6α (R', R"=hydrocarbon residue). By reaction with an acid, such as a hydrogen halide, sulfuric acid, phosphoric acid, organic acids, etc., there were obtained the salts of the 6α-amino compounds formed with such acids.

We subjected a compound of formula II, where the amino group at C–6α was a tertiary amino group, to well known transformations: by treatment with a peracid or with hydrogen peroxide there was produced the 6α-N- oxido-amino compound of formula III; by treatment with a halogenated hydrocarbon such as methyl, ethyl or other alkyl iodide, chloride or bromide, we produced the quaternary ammonium salts of formula IV, wherein X′=iodine, chlorine or bromine; by reaction with a dialkylsulfate or with an alkyl-aryl-sulfonate we obtained the quaternary ammonium salts of formula IV, where X′=alkylsulfate or arylsulfonate, respectively; such quaternary ammonium salts were also converted into the respective quaternary ammonium salts wherein X′=ClO$_4$, by reaction with silver perchlorate; the quaternary halides can be converted into other quaternary ammonium salts, such as the phosphate or perchlorate, by conventional methods.

The conversion of I into II was preferably conducted in benzene solution at room temperature, although the respective amine can be used in any other organic solvent inert to this reaction. The amine used was substituted on the nitrogen with one or two hydrocarbon residues, saturated or unsaturated, of straight, branched, cyclic or mixed cyclic-aliphatic chain; the hydrocarbon residue can optionally be substituted with halogen, oxygen, hydroxyl groups, acyloxy groups or other groups; such amines were, for example, methylamine, ethylamine, diethylamine, methylethylamine, ethanolamine, diethanolamine, β-diacetoxydiethylamine, piperidine, aniline, morpholine, pyridine or N-methylaniline.

The conversion of a secondary amino group of a compound of formula II into the N-oxido-amino group III was preferably carried out by reaction with monoperphthalic acid in mixture with ether.

For the formation of the quaternary salts of formula IV, the reaction was conducted in a sufficiently polar solvent, such as nitromethane; the hydroxides of the 6α-amino compounds were formed from the quaternary ammonium salts by treatment with moist silver oxide, for example in mixture with aqueous ethanol; the quaternary ammonium salts of perchloric acid were obtained by treatment of other quaternary ammonium salts with silver perchlorate, preferably starting from the iodides.

Starting from a 21-ester of I we obtained the compounds of formulas II–IV under the form of the corresponding 21-esters. By conventional methods we hydrolyzed the ester groups and re-esterified the hydroxyl group; for example, the hydrolysis was effected by reaction with methanolic potassium hydroxide solution at low temperature and under an atmosphere of nitrogen; the re-esterification was effected by treatment with the anhydride of any hydrocarbon carboxylic acid of up to 12 carbon atoms, saturated or unsaturated, of straight, branched, cyclic or mixed cyclic-aliphatic chain, substituted or not with methoxy, halogen or other groups. Thus we prepared a great variety of 21-esters of II–IV, wherein R represents, among other groups, the acetate, propionate, butyrate, hemisuccinate, enanthate, caproate, benzoate, trimethylacetate, phenoxyacetate, cyclopentylpropionate, phenylpropionate or β-chloropropionate.

The following specific examples serve to illustrate but are not intended to limit the present invention.

Example I

A mixture of 5 g. of cortisone 21-acetate, 35 cc. of anhydrous dioxane, 5 cc. of ethyl orthoformate and 150 mg. of p-toluenesulfonic acid monohydrate was stirred for 35 minutes and then 5 cc. of pyridine was added, followed by the addition of water until complete precipitation of the reaction product. The precipitate was collected by filtration, washed with water, dried and recrystallized from methanol. There was thus obtained 3-ethoxy-$\Delta^{3,5}$-pregnadien-17α,21-diol-11,20-dione 21-acetate.

Example II

By substituting in the method of the above example the 21-acetate of cortisone by that of 9α-chloro-cortisone, there was obtained 9α-chloro-3-ethoxy-$\Delta^{3,5}$-pregnadien-17α,21diol-11,20-dione 21-acetate.

Example III

In the method of Example I, instead of cortisone acetate, the starting material used was 9α-fluoro-cortisone 21-acetate; there was obtained 9α-fluoro-3-ethoxy-$\Delta^{3,5}$-pregnadien-17α,21-diol-11,20-dione 21-acetate.

Example IV

By substituting in the methods of the above examples the acetate group at C–21 of the starting compound by another ester group, there were obtained the 3-enol-ethers with the corresponding ester group. For example, from 9α-chloro-cortisone 21-propionate we obtained by reaction with ethyl orthoformate 9α-chloro-3-ethoxy-$\Delta^{3,5}$-pregnadien-17α,21-diol-11,20-dione 21-propionate.

Example V

A mixture of 4 g. of 3-ethoxy-$\Delta^{3,5}$-pregnadien-17α,21-diol-11,20-dione 21-acetate, 2.1 g. of anhydrous sodium acetate and 120 cc. of acetone was cooled to 0° C. and treated with 3.7 g. of N-bromosuccinimide and then with 2 cc. of glacial acetic acid. The mixture was stirred at 0–5° C. for 3 hours, then ice water was added and the mixture was kept overnight at a temperature around 0° C. The precipitate was collected, washed with water, air dried and recrystallized from a mixture of ether and acetone containing a few drops of pyridine. There was thus obtained 6β-bromo-cortisone 21-acetate, M.P. 158–160° C. (dec.); $[\alpha]_D$ −86° (chloroform); ultraviolet absorption: $\lambda$ max. 242, log E 4.11.

A slow stream of dry hydrogen chloride was introduced for 70 minutes into a mixture of 2 g. of the above compound and 50 cc. of glacial acetic acid, maintaining the temperature at 15–20° C. After pouring into water the precipitate was collected, washed with water, dried in vacuum and recrystallized from methylene chloride-ether. There was thus obtained 6α-bromo-cortisone 21-acetate; M.P. 157–159° C.; $[\alpha]_D$ +125° (chloroform); $\lambda$ max. 236 m$\mu$.

A mixture of 1 g. of 6α-bromo-cortisone 21-acetate, 50 cc. of tertiary butanol, 0.4 g. of selenium dioxide and 0.2 cc. of pyridine was refluxed for 72 hours under an atmosphere of nitrogen, filtered through celite, washing the filter with 20 cc. of hot tertiary butanol, and the combined filtrate and washings was evaporated to dryness under reduced pressure. The residue was dissolved in acetone, decolorized with charcoal, dried over anhydrous sodium sulfate and the solvent was evaporated. Chromatographic purification of the residue furnished 6α-bromo-prednisone 21-acetate.

Example VI

In the method of the previous example there was substituted for the 21-ester of cortisone a 21-ester of its 9α-chloro analog or its 9α-fluoro analog.

For example, 9α-chloro-cortisone 21-acetate was treated by the method of Example V to produce 9α-chloro-3-ethoxy-$\Delta^{3,5}$-pregnadien-17α,21-diol-11,20-dione 21-acetate, which was converted into 6β-bromo-9α-chloro-cortisone 21-acetate. From 9α-fluoro-cortisone 21-acetate there were obtained the aforementioned compounds having a fluorine atom at position C–9α instead of chlorine.

Example VII

A solution of 5 g. of 6β-bromo-9α-chloro-cortisone 21-acetate in 250 cc. of tertiary butanol was treated with 2 g. of selenium dioxide and 1 cc. of pyridine and the mixture was refluxed for 72 hours under an atmosphere of nitrogen and then filtered through celite, washing the filter with hot tertiary butanol. The filtrate and washings were combined and evaporated to dryness under reduced pressure. The residue was dissolved in acetone, decolorized with charcoal and the solvent was evaporated. The residue was chromatographed on neutral alumina to give 6β-bromo-9α-chloro-prednisone 21-acetate.

Example VIII

By the same method there was introduced an additional double bond between C-1 and C-2 of 6β-bromo-9α-fluoro-cortisone 21-acetate.

Example IX

Alternatively, the preparation of the 21-acetate of 6β-bromo-prednisone and of its analogs further halogenated at C-9 with fluorine or chlorine was effected by Wohl-Ziegler bromination as described by Kendall at al. (J. Biol. Chem., 197, 261 (1952)) for the preparation of 6β-bromo-cortisone acetate.

Traces of moisture were removed by distilling a few cc. of a mixture of 1.5 g. of prednisone 21-acetate, 160 cc. of chlorobenzene and 180 cc. of carbon tetrachloride. Then there was added 4.2 cc. of a 10% solution of anhydrous pyridine in dry carbon tetrachloride, followed by 800 mg. of powdered N-bromosuccinimide. The container was attached to a reflux condenser, the apparatus was flushed with carbon dioxide and the mixture was illuminated with a 50 watt lamp while it was heated, for example with a "glascol" mantle, until the solution started to boil. After boiling for 10 minutes the mixture was cooled, and filtered and the filtrate was washed with water and concentrated. Upon cooling a bulky precipitate separated which was collected by filtration and recrystallized from acetone-methanol and then from chloroform-hexane. There was thus obtained 6β-bromo-prednisone 21-acetate.

By substituting in this method the prednisone 21-acetate by the acetate of its C-9α-fluoro or chloro analog, there was obtained 6β-bromo-9α-fluoro-prednisone 21-acetate or 6β-bromo-9α-chloro-prednisone 21-acetate, respectively.

The same method can be applied to the preparation of the 6β-bromo-9α-halo analogs of cortisone and prednisone.

Example X

In other experiments, in accordance with the previous examples, there was used another ester of the starting compound instead of the 21-acetate, to produce the 6-bromo compounds under the form of the respective 21-esters. The 21-hydroxy compounds were obtained by hydrolysis of the ester group at C-21, for example by reaction with methanolic potassium hydroxide.

Example XI

A solution of 2 g. of 6β-bromo-cortisone 21-acetate in 60 cc. of dry benzene was cooled in an ice bath and a slow stream of dimethylamine was introduced for 10 minutes. The dimethylamine was generated by decomposition of 6 g. of its hydrochloride with a solution of 6 g. of sodium hydroxide in 20 cc. of water, regulating the production of the reagent by controlling the addition and the temperature. The benzene solution was allowed to react in a closed container for a period of 24 hours in the dark; the dimethylamine hydrobromide was removed by washing with water and then the solvent was evaporated under reduced pressure. The residue was dissolved in 7 cc. of pyridine, treated with an equal amount of acetic anhydride and allowed to react overnight at room temperature; the mixture was poured into water, kept standing for 1 hour in order to hydrolyze the excess on anhydried, cooled, neutralized with concentrated aqueous sodium bicarbonate solution, extracted with ethyl acetate and the extract was washed with water; the organic layer was then extracted with 5% hydrochloric acid to separate the basic fraction and leaving the unreacted 6β-bromo-cortisone 21-acetate in the organic solvent. The aqueous phase was alkalinized with sodium bicarbonate solution and the product was extracted with ethyl acetate; the extract was washed with water to neutral, dried over anhydrous sodium sulfate and evaporated to dryness under reduced pressure. The oily residue was purified by chromatography in a column of silica gel and eluting the 6α-dimethyl amino-cortisone 21-acetate with a mixture of benzene and ether 60:40; it showed M.P. 225–226° C.

Example XII

By substituting in the method of the previous example the 6β-bromo-cortisone 21-acetate by 6β-bromo-prednisone acetate there was obtained 6α-dimethylamino-prednisone 21-acetate.

Example XIII

A suspension of 1 g. of 6β-bromo-cortisone 21-acetate was treated with 5 cc. of piperidine, refluxed for 1 hour and poured into water; the reaction product was isolated exactly as described in Example XI. There was thus finally obtained 6α-piperidyl-cortisone 21-acetate.

Example XIV

By substituting in the method of the previous example the 6β-bromo-cortisone 21-acetate by 6β-bromo-prednisone 21-acetate, there was obtained 6α-piperidyl-prednisone 21-acetate.

Example XV

The amines mentioned in the previous examples were substituted by other amines, to produce the 21-acetates of the corresponding 6α-amino-cortisones and 6α-amino-prednisones. By reaction of 6β-bromo-cortisone 21-acetate with methylamine, for example, there was obtained 6α-methylamino-cortisone 21-acetate; by reaction of 6β-bromo-prednisone 21-acetate with morpholine there was obtained 6α-morpholidyl-prednisone 21-acetate.

Example XVI

By following the methods of the previous examples, the 21-acetates of the 6β-bromo-9α-halo (chloro or fluoro)-analogs of cortisone or of prednisone were treated with any of the amines previously specified in the general description of the process of the present application, to obtain the 21-acetates of the corresponding 6α-amino-11-keto cortical hormones.

Example XVII

A solution of 3 g. of 6α-dimethylamino-cortisone 21-acetate, obtained in accordance with the method of Example XI, in 50 cc. of nitromethane was treated with 10 cc. of methyl iodide and the mixture was allowed to stand at room temperature in the dark for 5 days. The nitromethane and the excess of methyl iodide were evaporated under reduced pressure and the residue was triturated with acetate. There was thus obtained the 21-acetate of 6α-trimethyl-ammonio-cortisone iodide, which was purified by recrystallization from acetone-hexane.

A mixture of 2 g. of the above compound, 100 cc. of 80% ethanol and 5 g. of recently precipitated silver oxide was stirred in the dark at room temperature for 24 hours. The solution was filtered through celite, washing the filter with ethanol, and the filtrate and washings were combined and evaporated to dryness under reduced pressure. The residue was dissolved in acetone, treated with decolorizing charcoal and stirred for 1 hour at room temperature; the solution was filtered through celite and concentrated. Upon cooling there separated the 21-acetate of 6α-trimethylammonio-cortisone hydroxide.

Example XVIII

By substituting in the method of the previous example the 21-acetate of 6α-dimethylamino-cortisone by that of 6α-dimethylamino-prednisone, there were obtained the 21-acetates of 6α-trimethylamino-prednisone, iodide and of 6α-trimethylammonio-prednisone hydroxide, respectively.

Example XIX

By substituting in the methods of Examples XVII and XVIII the methyl iodide by any other monohalogenated aliphatic or aromatic hydrocarbon, as specified in the general description of the process of the present application, there were obtained the halides and hydroxides of the respective quaternary ammonio compounds. The halogenated hydrocarbon can also be reacted with any 6α-amino-analog of cortisone or prednisone, with or without a halogen substituent at C-9α, as obtained by reaction of the respective 6β-bromo cortical hormone with a secondary amine. By reaction of 6β-bromo-9α-fluoro-prednisone 21-acetate, for example, with dimethylamine, we prepared 6α-dimethylamino-9α-fluoro-prednisone 21-acetate; the latter compound was treated with benzyl chloride to obtain the 21-acetate of 6α-dimethylbenzylammonio-9α-fluoro-prednisone chloride and then the 21-acetate of 6α-dimethylbenzylammonio-9α-fluoro-prednisone hydroxide.

*Example XX*

By substituting in the methods described in Examples XVII to XIX the halogenated hydrocarbon by dimethyl sulfate, there were obtained the methylsulfates of the quaternary ammonium salts instead of the halides.

*Example XXI*

A solution of 500 mg. of 6α-dimethylamino-cortisone 21-acetate in 50 cc. of ether was treated with 6 cc. of ether containing 1.3 molar equivalents of monoperthalic acid and the solution was allowed to stand overnight at room temperature and in the dark for 24 hours. It was then washed with water to neutral, dried over anhydrous sodium sulfate and the ether was evaporated. Chromatography of the residue on silica gel afforded the N-oxide of 6α-dimethylamino-cortisone 21-acetate.

*Example XXII*

In several other experiments there was used as starting material a 6β-bromo-11-keto cortical hormone esterified at C-21 with the radical of an acid different from acetic acid, to obtain the 6α-amino and 6α-ammonio compounds under the form of the respective 21-ester. Starting from 6β-bromo-9α-fluoro-cortisone 21-propionate, for example, there were prepared the 21-propionates of 6α-dimethylamino-9α-fluoro-cortisone, of 6α-trimethylammonio-9α-fluoro-cortisone iodide and of 6α-trimethylammonio-9α-fluoro-cortisone hydroxide.

*Example XXIII*

To a suspension of 1 g. of 6α-dimethylamino-cortisone 21-acetate in 10 cc. of absolute methanol there was added a solution of sodium methoxide prepared by dissolving 60 mg. of sodium metal in 10 cc. of absolute methanol and the mixture was stirred for 1 hour at a temperature around 0° C. and under an atmosphere of nitrogen. It was then poured into 100 cc. of water containing 0.2 cc. of acetic acid and the precipitate was collected by filtration, washed, dried and recrystallized from acetone-hexane. There was thus obtained the free 6α-dimethylamino-cortisone.

*Example XXIV*

By following the method of the previous example, there were hydrolyzed the acyloxy groups of all of the 6α-amino and 6α-ammonio compounds comprised in our invention and described in the previous examples, to produce the respective 21-hydroxy compounds, which were re-esterified at C-21 by conventional methods, preferably by treatment in pyridine solution with the anhydride of a hydrocarbon carboxylic acid of up to 12 carbon atoms, at room temperature. In this way there was prepared 21-acetates, propionates, cyclopentylpropionates and benzoates.

When the reaction of the starting 21-ester of a 6β-bromo-compound was carried out with an esterified alkanol- or dialkanol-amine, there was obtained the 21-ester of the corresponding 6α-acyloxyamino cortical hormone. For example, by a reaction of 6β-bromo-cortisone 21-propionate with diacetoxydiethylamine there was obtained 6α-diacetoxy-diethylamino-cortisone 21-propionate, which was converted into the free 6α-diethanolamino-cortisone by the aforementioned reaction with sodium methoxide; the latter compound was re-esterified by reaction with propionic anhydride in pyridine solution, thus giving 6α-dipropionoxy-diethylamino-cortisone 21-propionate.

We claim:
1. A compound of the following formula:

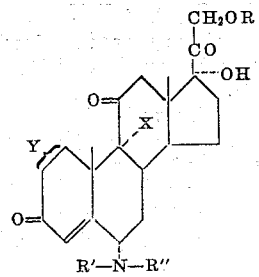

wherein Y is selected from the group consisting of a double bond between C-1 and C-2 and a saturated linkage between C-1 and C-2, R is selected from the group consisting of hydrogen and a hydrocarbon carboxylic acyl group of up to 12 carbon atoms, R' and R" are selected from the group consisting of R' is hydrogen and R" is hydrocarbon of up to 12 carbon atoms, R' and R" are hydrocarbon of up to 12 carbon atoms and both R' and R" form a cyclic hydrocarbon, and X is selected from the group consisting of hydrogen, fluoro and chloro.
2. 6α-dimethylamino-cortisone.
3. 6α-dimethylamino-cortisone 21-acetate.
4. 6α-dimethylamino-prednisone 21-acetate.
5. 6α-piperidyl-cortisone 21-actate.
6. 6α-piperidyl-prednisone 21-acetate.
7. 6α-diacetoxy-diethylamino-cortisone 21-propionate.
8. 6α-diethanolamino-cortisone.
9. 6α-dipropionoxy-diethylamino-cortisone 21-propionate.
10. 6α-dimethylamino-9α-fluoro-prednisone 21-acetate.
11. A compound of the following formula:

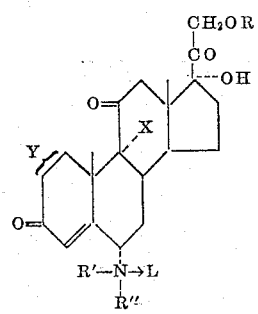

wherein Y is selected from the group consisting of a double bond between C-1 and C-2 and a saturated linkage between C-1 and C-2, R is selected from the group consisting of hydrogen and hydrocarbon carboxylic acyl group of up to 12 carbon atom, R' and R" are selected from the group consisting of R' is hydrogen and R" is hydrocarbon of up to 12 carbon atoms, R' and R" are hydrocarbon of up to 12 carbon atoms and both R' and R" form a cyclic hydrocarbon, and X is selected from the group consisting of hydrogen, fluoro and chloro.
12. The N-oxide of 6α-dimethylamino-cortisone 21-acetate.
13. A compound of the following formula:

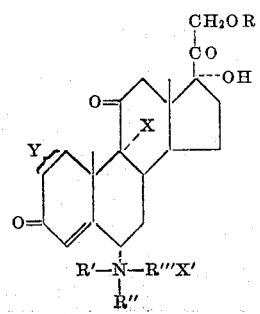

wherein Y is selected from the group consisting of a double bond between C-1 and C-2 and a saturated linkage between C-1 and C-2, R is selected from the group consisting of hydrogen and hydrocarbon carboxylic acyl group of up to 12 carbon atoms, R' and R" are selected from the group consisting of R' is hydrogen and R" is hydrocarbon of up to 12 carbon atoms, R' and R" are hydrocarbon of up to 12 carbon atoms and both R' and R" form a cyclic hydrocarbon, and X is selected from the group consisting of hydrogen, fluoro and chloro, R''' is hydrocarbon of up to 12 carbon atoms, and X' is selected from the group consisting of iodine, chlorine, bromine, $HSO_4$, $ArSO_3$, $ClO_4$ and hydroxyl.

14. The 21-acetate of 6α-trimethylammonio-cortisone iodide.

15. The 21-acetate of 6α-trimethylammonio-cortisone hydroxide.

16. The 21-acetate of 6α-trimethylammonio-prednisone iodide.

17. The 21-acetate of 6α-trimethylammonio-prednisone hydroxide.

18. The 21-acetate of 6α-dimethylbenzylammonio-9α-fluoro-prednisone chloride.

19. The 21-acetate of 6α-dimethylbenzylammonio-9α-fluoro-prednisone hydroxide.

No references cited.